United States Patent [19]
Mugino et al.

[11] Patent Number: 5,321,782
[45] Date of Patent: Jun. 14, 1994

[54] DIRECTIONAL COUPLER TYPE OPTICAL FUNCTION ELEMENT

[75] Inventors: Akira Mugino, Ichihara; Hisaharu Yanagawa, Tokyo, both of Japan

[73] Assignee: Furukawa Electric Co., Ltd., Tokyo, Japan

[21] Appl. No.: 82,055

[22] Filed: Jun. 22, 1993

Related U.S. Application Data

[63] Continuation-in-part of Ser. No. 815,921, Dec. 30, 1991, abandoned.

[30] Foreign Application Priority Data

Jan. 7, 1991 [JP] Japan .................................. 3-267
Jan. 7, 1991 [JP] Japan .................................. 3-268

[51] Int. Cl.$^5$ .............................................. G02B 6/26
[52] U.S. Cl. ........................................ 385/41; 385/39; 385/40; 385/42
[58] Field of Search ................. 385/41, 39, 40, 42, 385/50, 21

[56] References Cited

U.S. PATENT DOCUMENTS

| | | | |
|---|---|---|---|
| 4,492,425 | 1/1985 | Kersten et al. | 350/96.14 |
| 4,865,408 | 9/1989 | Korotky | 350/96.13 |
| 5,066,086 | 11/1991 | Angenent et al. | 385/41 |
| 5,146,518 | 9/1992 | Mak et al. | 385/41 |

FOREIGN PATENT DOCUMENTS 0378300 7/1990 European Pat. Off.

OTHER PUBLICATIONS

Technical Digest Integrated and Guide-wave Optics Feb. 1986 by P. Granestrand et al., "Strictly Non Blocking 8×8, Integrated Optic Switch Matrix".
1990 Autumn National Meeting C-216 of the Institute of Electronic Intelligence and Communication Engineers of Japan by H. M. Mak et al. "High Extinction Guided-Wave Optical Polarization Splitter".
Institute of Electrical and Electronics Engineers Journal (IEEE J.) of Quantum Electronics, vol. 24, Mar. 1988) by Jean-Pierre Weber et al. "Cross Talk and Switching Characteristics in Directional Couplers".
Institute of Electrical and Electronics Engineers Journal (IEEE J.) of Quantum Electronics, vol. QE-22, No. 6, Jun. 1986 by L. McCanghan et al. Cross Talk in Ti:LiNbO$_3$ Directional Coupler Switches Caused by Ti Concentration Fluctuations.
Lightwave Technology, vol. 6, No. 1, Jan., 1988, by T. K. Findakly et al. "On The Crosstalk of Reversed-$\Delta\beta$ Directional Coupler Switches".
17th European Conference on Optical Communication ECOC 91, Sep. 1991, Paris, France, pp. 525–528, H. M. Mak et al., High Extension Guide-Wave Devices Using Directional Coupler.

*Primary Examiner*—Rodney B. Bovernick
*Assistant Examiner*—Stephen W. Barns
*Attorney, Agent, or Firm*—Frishauf, Holtz, Goodman & Woodward

[57] ABSTRACT

A directional coupler type optical function element with a high extinction ratio, in which a junction of a 2-input/2-output directional coupler or 1-input/2-output directional coupler, formed of a semiconductor or dielectric, is formed by successively optically connecting, from the input side to the output side, a front-stage partial junction, front-stage partial junction with electrode, central partial junction, rear-stage partial junction with electrode, and rear-stage partial junction, each having a predetermined length. The connection state at the front-stage partial junction and an incidence-side lead section optically connected thereto and the connection state at the rear-stage partial junction and an emergence-side lead section optically connected thereto cancel each other, thereby equivalently providing a symmetrical connection state and preventing the extinction ratio for a cross mode from lowering. Moreover, by forming the central partial junction with a proper length, the extinction ratio for a through mode can be kept high enough. Thus, high extinction ratio characteristics can be enjoyed for both of the cross and through modes.

4 Claims, 13 Drawing Sheets

DIRECTIONAL COUPLER TYPE OPTICAL FUNCTION ELEMENT

This application is a continuation in part of Ser. No. 07/815,921, filed on Dec. 30, 1991 (now abandoned).

BACKGROUND OF THE INVENTION

1. Field of the Invention

The present invention relates to a directional coupler type optical function element of a novel construction, and more particularly, to a directional coupler type optical function element having very high extinction ratio characteristics and adapted for use as an optical switch, polarizing splitter, optical modulator, wavelength division multiplexer/demultiplexer.

2. Description of the Related Art

Recently, various optical function elements having a directional coupler of a waveguide type have been developed, and optical switches, polarizing splitters, optical modulators, wavelength division multiplexer/demultiplexer, etc. using these elements have been proposed.

FIGS. 1 and 2 show examples of conventional optical function elements of a directional coupler type. The element shown in FIG. 1 is a 2-input/2-output element, while the element shown in FIG. 2 is a 1-input/2-output element.

In FIG. 1, a junction $C_0$ of a length L is formed by arranging two optical waveguides A and B of equal widths W close to each other in parallel relation, with a distance G for evanescent connection between them.

Curved optical waveguides $D_1$, $D_2$, $D_3$ and $D_4$ with a path width W and curvature radius R are optically connected to the respective incidence ends $A_1$ and $B_1$ and emergence ends $A_2$ and $B_2$ of the optical waveguides A and B of the junction $C_0$, respectively, thus forming incidence-side lead section $C_1$ and emergence-side lead section $C_2$. Also, straight optical waveguides $E_1$, $E_2$, $E_3$ and $E_4$ with the path width W are optically connected to the curved optical waveguides $D_1$, $D_2$, $D_3$ and $D_4$, respectively, with a distance $G_0$ between the respective path-width centers of the waveguides $E_1$ and $E_2$ and between those of the waveguides $E_3$ and $E_4$. Electrodes $F_1$, $F_2$, $F_3$ and $F_4$ are mounted on the optical waveguides A and B of the junction $C_0$ so that electrical signals can be introduced from the electrodes into the waveguides. The distances between the electrodes $F_1$ and $F_3$ and between the electrodes $F_2$ and $F_4$ are substantially zero.

If the straight optical waveguide $E_1$ is an incidence port, the straight optical waveguides $E_3$ and $E_4$ serve as a through port and a cross port, respectively.

The 1-input/2-output element of FIG. 2 is a modified version of the 2-input/2-output element of FIG. 1, in which one straight optical waveguide $E_0$ is optically connected to only the incidence end $A_1$ of the optical waveguide A in a direct manner. In this element, the straight optical waveguides $E_3$ and $E_4$ serve as a through port and a cross port, respectively.

In order to incorporate these elements in a fiber communication system, which is going to be practically used, it is necessary to prevent errors attributable to cross talk. Thus, the elements are expected to be subject to less cross talk, that is, to have high extinction ratio characteristics.

In the case of the element shown in FIG. 1, a theoretically perfect cross mode is established to heighten the extinction ratio without limitation by applying proper electrical signals from the electrodes $F_1$, $F_2$, $F_3$ and $F_4$. Connections at the incidence- and emergence-side lead sections $C_1$ and $C_2$ cannot, however, provide a perfect through mode, and in this case the theoretical value of the extinction ratio ranges from about 20 to 30 dB at the highest.

In the case of the element shown in FIG. 2, moreover, the extinction ratio for the through mode can be made about 10 dB higher than that of the element shown in FIG. 1. For the cross mode, however, the extinction ratio ranges from only about 10 to 20 dB.

Thus, the conventional elements, which have a low extinction ratio for the through or cross mode, cannot exhibit high extinction ratio characteristics for both the through and cross modes.

The extinction ratio used here is a value given by the followed equation: $10 \log_{10}(|r|^2/|s|^2)$, where $|r|^2$ is the output power of the through port, and $|s|^2$ is the output power of the cross port.

Among optical function elements constructed in this manner, known examples of those which have relatively high extinction ratio characteristics include an optical switch with an extinction ratio of about 27 dB reported in Technical Digest Integrated and Guidewave Optics '86 by P. Granestrand et al. and a polarizing splitter with an extinction ratio of about 28 db reported in the 1990 Autumn National Meeting C-216 of the Institute of Electronic Intelligence and Communication Engineers of Japan by H.M. Mak et al.

Meanwhile, those optical function elements which are practically used in an optical communication system are expected to have an extinction ratio of 15 dB or more.

To meet this requirement, intense studies have been made of the causes of low extinction ratios of directional coupler type optical function elements.

Among these studies, there is one whose results are described in Institution of Electrical and Electronics Engineers Journal (IEEE. J.) of Quantum Electronics (Vol. 24, March, 1988) by Jean-Pierre Weber et al. This description indicates that the low extinction ratio is attributable to difficulty in refractive index control of the directional coupler for a required switching state.

L. McCanghan et al. also reported in in IEEE. J. of Quantum Electronic (Vol. QE-22, No. 6, June, 1986) that the low extinction ratio is attributable to the irregularity of the refractive index of optical waveguides with respect to the extending direction thereof (direction of light propagation).

Further, T. K. Findakly et al. indicated the following in Journal of Lightwave Technology (Vol. 6, No. 1, January, 1988). According to this report, the extinction ratio is inevitably lowered because switching state cannot be obtained in a through mode due to the existence of small connections at incidence- and emergence-side lead sections for connecting optical fibers.

Among the three causes described in these reports, the one reported by Jean-Pierre Weber et al. can be removed by properly selecting the method of driving the element and the material of the optical waveguides. Further, the cause reported by L. McCanghan et al. can be removed by improving film growth control during the formation of the optical waveguides.

The cause indicated by T. K. Findakly et al., however, is an unavoidable problem which cannot be solved unless the outside diameter of the optical fiber to be connected is reduced to several micrometers so that the element requires no lead sections.

In the case of the optical function element of the conventional construction shown in FIG. 1, the extinction ratio is lowered only for the through mode due to the connections at the incidence- and emergence-side lead sections $C_1$ and $C_2$ even though the element is a perfectly symmetrical directional coupler.

The extinction ratio characteristics of the optical function element depend on the lower one of the extinction ratios for the through and cross modes. Even in case the extinction ratio for the cross mode is unlimited, therefore, the whole element can enjoy only a low extinction ratio if that for the through mode is low.

In the case of the optical function element shown in FIG. 1, moreover, the extinction ratio for the cross mode can be also lowered if the incidence- and emergence-side lead sections $C_1$ and $C_2$ do not have the same configuration.

In many of practical versions of the element of FIG. 1, for example, the radius of curvature of the incidence-side lead section $C_1$ is different from that of the emergence-side lead section $C_2$, so that these sections are not symmetrical. In such a case, the extinction ratio for the cross mode, as well as that for the through mode, is lowered for the aforesaid reason.

Thus, in the conventional directional coupler type optical function elements, the extinction ratio for the through mode is low, and that for the cross mode is also lowered if the incidence- and emergence-side lead sections $C_1$ and $C_2$ are not symmetrical.

OBJECT AND SUMMARY OF THE INVENTION

The object of the present invention is to provide a directional coupler type optical function element of a novel construction capable of exhibiting an extinction ratio of 30 dB or more for either of through and cross modes.

In order to achieve the above object, according to the present invention, there is provided a directional coupler type optical function element which comprises: a directional coupler including a junction of a length L having two parallel optical waveguides of equal widths formed of a material exhibiting an electrooptical effect or a material capable of refractive index control by means of an electrical signal. At least one optical waveguide is optically connected to the incidence end of one of the optical waveguides of the junction, and curved optical waveguides are connected individually to the respective emergence ends of the two optical waveguides of the junction. The junction includes a front-stage partial junction of a length $p_1 \times L$, a front-stage partial junction with an electrode of a length $(1 - p_1 - p_2 - p_3) \times L/2$, a central partial junction of a length $p_2 \times L$, a rear-stage partial junction with an electrode of the same length as that of the front-stage partial junction with an electrode, and a rear-stage partial junction of a length $p_3 \times L$. The $p_1$, $p_2$ and $p_3$ parameters being decimals or zero satisfying a relation $p_1 + p_2 + p_3 < 1$ ($p_2 \neq 0$, and $P_1$ and $P_3$ are not simultaneously zero).

More specifically, there is provided a 2-input/2-output directional coupler type optical function element which comprises a directional coupler including a junction of a length L having two parallel optical waveguides of equal widths formed of a material exhibiting an electrooptical effect or a material capable of refractive index control by means of an electrical signal, the respective incidence ends of the two optical waveguides of the junction being optically connected to curved optical waveguides, individually, thereby forming an incidence-side lead section, the respective emergence ends of the two optical waveguides of the junction being optically connected to a curved optical waveguide, individually, thereby forming an emergence-side lead section, the junction including a front-stage partial junction of a length $p_1 \times L$, a front-stage partial junction with an electrode of a length $(1 - p_1 - p_2 - p_3) \times L/2$, a central partial junction of a length $p_2 \times L$, a rear-stage partial junction with an electrode of the same length as that of the front-stage partial junction with an electrode, and a rear-stage partial junction of a length $p_3 \times L$, where the $p_1$, $p_2$ and $p_3$ are decimals or zero satisfying a relation $p_1 + p_2 + p_3 < 1$ ($p_2 \neq 0$). Alternatively, there is provided a 1-input/2-output directional coupler type optical function element which comprises a directional coupler including a junction of a length L having two parallel optical waveguides of equal widths formed of a material exhibiting an electrooptical effect or a material capable of refractive index control by means of an electrical signal, only one of the two optical waveguides of the junction being optically connected at the incidence end thereof with a straight optical waveguide, the respective emergence ends of the two optical wabeguides of the junction being optically connected to a curved optical waveguide, individually, thereby forming an emergence-side lead section, the junction including a front-stage partial junction of a length $p_1 \times L$, a front-stage partial junction with an electrode of a length $(1 - p_1 - p_2 - p_3) \times L/2$, a central partial junction of a length $p_2 \times L$, a rear-stage partial junction with an electrode of the same length as that of the front-stage partial junction with an electrode, and a rear-stage partial junction of a length $p_3 \times L$, where the $p_1$, $p_2$ and $p_3$ parameters are decimals or zero satisfying a relation $p_1 + p_2 + p_3 < 1$ ($p_1$, $p_2 \neq 0$).

DETAILED DESCRIPTION OF THE INVENTION

Figure 1:
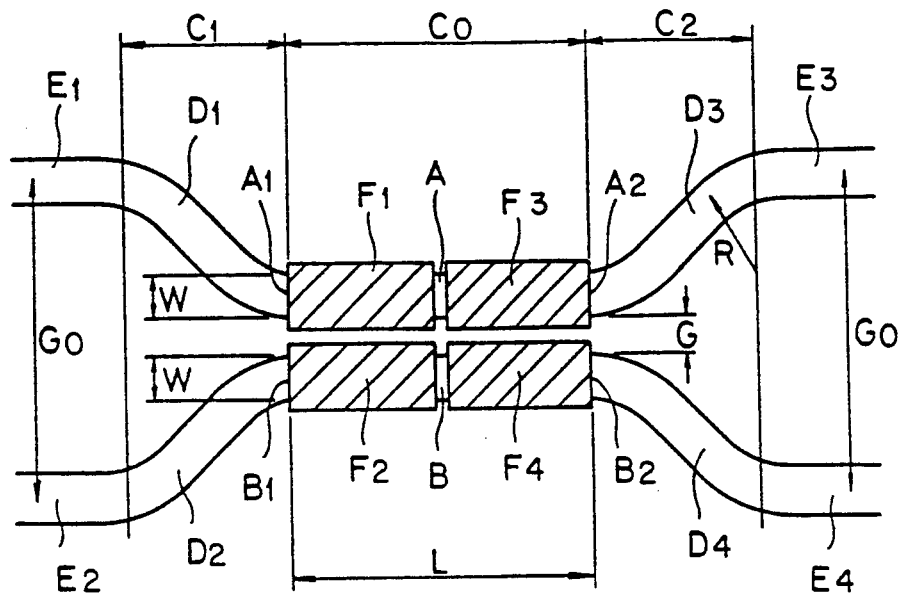
FIG. 1 is a plane pattern diagram showing a configuration of a conventional 2-input/2-output directional coupler.
Figure 3:
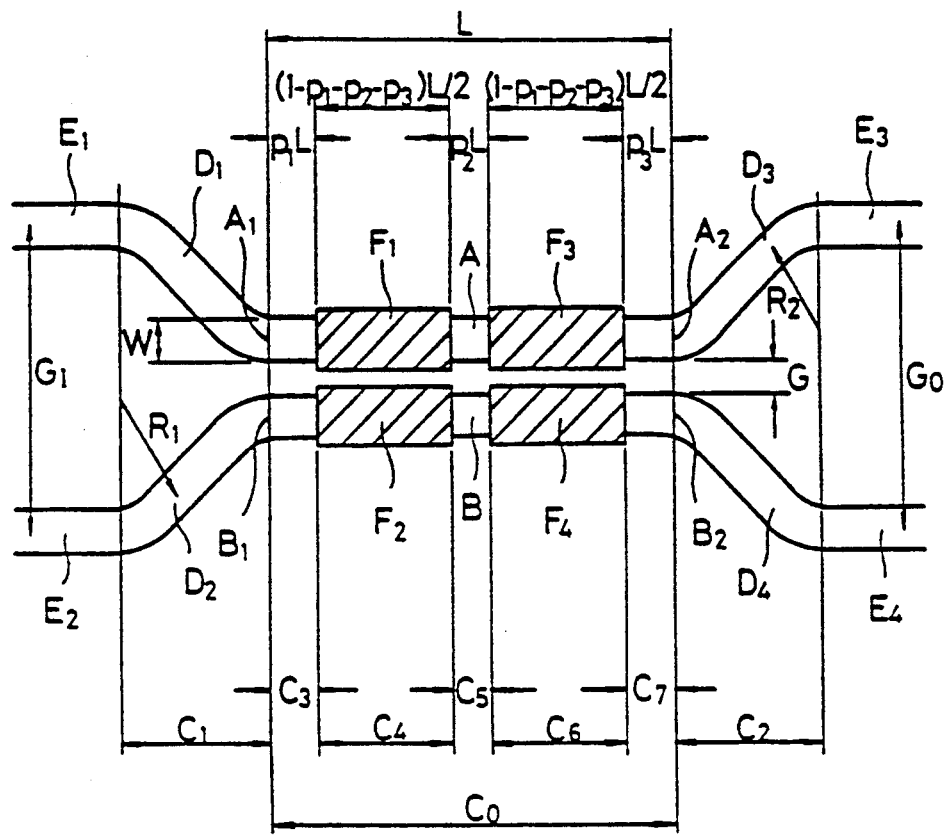
FIG. 3 is a plane pattern diagram showing the basic configuration of a 2-input/2-output directional coupler type optical function element according to the present invention.

FIG. 3 is a plane pattern diagram showing the basic configuration of a 2-input/2-output directional coupler type optical function element according to the present invention. As seen from FIG. 3, a plane pattern of the optical function element of the invention differs from the conventional 2-input/2-output directional coupler type optical function element shown in FIG. 1 only in that a junction $C_0$ is constructed as follows.

First, two optical waveguides A and B with the same width (path width W) are arranged parallel to each other with a fine space G between them at the junction $C_0$, and curved optical waveguides $D_1$ and $D_2$ with a curvature radius $R_1$ and a path width W are optically connected to incidence ends $A_1$ and $B_1$ of the waveguides A and B, respectively, thus constituting an incidence-side lead section $C_1$. Likewise, curved optical waveguides $D_3$ and $D_4$ with a curvature radius $R_2$ and the path width W are optically connected to emergence ends $A_2$ and $B_2$ of the waveguides A and B, respectively, thus constituting an emergence-side lead section $C_2$. At the incidence-side lead section $C_1$, moreover, straight optical waveguides $E_1$ and $E_2$ with the path width W are optically connected to the curved optical waveguides $D_1$ and $D_2$, respectively, so that the distance between the respective centers of the waveguides $E_1$ and $E_2$ is $G_1$. At the emergence-side lead section $C_2$, on the other hand, straight optical waveguides $E_3$ and $E_4$ with the path width W are optically connected to the curved optical waveguides $D_3$ and $D_4$, respectively, so that the distance between the respective centers of the waveguides $E_3$ and $E_4$ is $G_0$. If the straight optical waveguide $E_1$ is an incidence port, the straight optical waveguides $E_3$ and $E_4$ serve as a through port and a cross port, respectively.

According to the present invention, the incidence- and emergence-side lead sections $C_1$ and $C_2$ are not limited to the illustrated arrangement including the curved optical waveguides. Alternatively, for example, the incidence end $A_1$ and the straight optical waveguide $E_1$, the incidence end $B_1$ and the straight optical waveguide $E_2$, the emergence end $A_2$ and the straight optical waveguide $E_3$, and the emergence end $B_2$ and the straight optical waveguide $E_4$ may be optically connected to one another by means of finely tapered straight optical waveguides, individually.

Any of these optical waveguides is formed of a material which generates an electrooptical effect or a material of a structure such that its refractive index can be controlled by means of an electrical signal. For example, each optical waveguide may be a multilayer laminate structure of a semiconductive material, such as GaAs/AlGaAs, formed by the MOCVD method.

The junction $C_0$ is formed by optically connecting a front-stage partial junction $C_3$, front-stage partial junction $C_4$ with electrode, central partial junction $C_5$, rear-stage partial junction $C_6$ with electrode, and rear-stage partial junction $C_7$ in the order named, ranging from the incidence ends $A_1$ and $B_1$ to the emergence ends $A_2$ and $B_2$ thereof.

If the overall length of the junction $C_0$ is L, and if $p_1$, $p_2$ and $p_3$ are decimals or zero satisfying a relation $p_1 + p_2 + p_3 < 1$ ($p_2 \neq 0$), the length of the front-stage partial junction $C_3$ is $p_1 \times L$, that of the front-stage partial junction $C_4$ with electrode is $(1 - p_1 - p_2 - p_3) \times L/2$, that of the central partial junction $C_5$ is $p_2 \times L$, that of the rear-stage partial junction $C_6$ with electrode is $(1 - p_1 - p_2 - p_3) \times L/2$, and that of the rear-stage partial junction $C_7$ is $p_3 \times L$.

According to the present invention, as shown in FIG. 3, the length of respective regions $C_3$ and $C_7$ is determined so that the coupling effect of the regions $(C_2 \div C_7)$ is equal to that of the regions $(C_1 \div C_3)$ in the cross mode. Therefore, according to the directional coupler shown in FIG. 3, the regions $(C_4 \div C_5 \div C_6)$ become perfectly symmetrical in the cross mode.

The length of respective regions $C_3$ and $C_7$ is determined on the basis of the following equation:

$$\kappa p_3 L \div \int_L^{\infty} \kappa_{RO}(z) dz = \kappa p_1 L \div \int_{\infty}^{\epsilon} \kappa_{RI}(z) dz \quad (1)$$

where $\iota$ is the coupling coefficient in the parallel interaction section, and $\iota\, RI(Z)$ and $\iota\, RO(Z)$ are the functions of coupling coefficient relative to the position of z of the input and output lead regions. Details concerning this equation are set forth in a paper titled "High Extinction Guided-Wave Devices Using Directional Coupler" by Hon-Ming Mak and H. Yamagawa which was published on pages 525–528 of the publication put out by the 17th European Conference on Optical Communication ECOC '91, the contents of which are incorporated by reference.

For example, in FIG. 3, the curvature radius $R_1$ and $R_2$ of the regions $C_1$ and $C_2$ have a relation of $R_1 \neq R_2$, namely, these regions are non-symmetrical, coefficients $p_1$ and $p_3$ are determined so as to satisfy the equation presented above. Further, if the length of the respective regions $C_3$ and $C_7$ is determined on the basis of the coefficients, the coupling effect of the regions $(C_1 \div C_3)$ and that of the regions $(C_2 \div C_7)$ can be equalized to each other. Thus, the entirety of this element can operate as a function element composed of perfectly symmetrical regions $(C_4 + C_5 + C_6)$.

The non-symmetry caused in the incidence- and emergence-side lead sections is eliminated in the cross mode to thereby prevent the extinction ratio from lowering due to the non-symmetry.

Sequentially, in order to prevent the extinction ratio from lowering in the through mode, according to the element shown in FIG. 3, the length of the region $C_5$ is selected so that the coupling effect of the region $C_5$ is equal to the sum of the regions $(C_1 + C_3)$ and $(C_2 + C_7)$.

Explained in more detail, in a case where the coupling effect of the incidence-side lead section is weaker in non-symmetry than that of the emergence-side lead section, the region $C_3$ of the length $p_1 \times L$ is provided, and the region $C_7$ is not provided (the length is $p_3 \times L = 0$). Then, the coefficient $p_2$ is determined so that the coupling effect of the regions ($C_1$ and $C_3$) is equal to that of the region $C_2$. Thus, the length of the region $C_5$ is determined. Further, if the region $C_7$ of the length $p_3 \times L \neq 0$ is provided, the coefficient $p_2$ is determined so that the coupling effect of the region $C_5$ is equal to the sum of the regions $(C_1 + C_3)$ and $(C_2 + C_7)$.

Conversely, in a case where the coupling effect of the incidence-side lead section is stronger in non-symmetry than that of the emergence-side lead section, the region $C_7$ of the length $p_3 \times L$ is provided, and the region $C_3$ is not provided (the length is $p_1 \times L = 0$). Thus, the length $p_2 \times L$ of the region $C_5$ is determined so that the coupling effect of the regions $(C_2 + C_7)$ is equal to that of the region $C_1$. Further, if the region $C_3$ of the length $p_1 \times L \neq 0$ is provided, the length $p_2 \times L$ of the region $C_5$ is determined so that the coupling effect of the region $C_5$ is equal to the sum of the regions $(C_1 + C_3)$ and $(C_2 + C_7)$.

In other words, for all cases mentioned above that the length of the region $C_5$ is determined, this is done on the basis of the following equation:

$$\kappa p_2 L = \kappa p_1 L + \int_{-\infty}^{0} \kappa RI(z)dz + \kappa p_3 L + \int_{0}^{\infty} \kappa RO(z)dz \qquad (2)$$

where $\kappa$ is the coupling coefficient in the parallel interaction section, $\kappa RI(Z)$ and $\kappa RO(Z)$ are the functions of coupling coefficient relative to position z of the input and output lead regions. Details concerning this equation are also set forth in the same paper mentioned above.

Moreover, to summarize the above, according to the present invention, the coefficients $p_1$ and $p_3$ are determined on the basis of the above-presented equation (1).

Then, based on the determined coefficients $p_1$ and $p_3$, the coefficient $p_2$ is determined on the basis of the above-presented equation (2) which provides a higher extinction ratio in the through mode.

Figure 4:
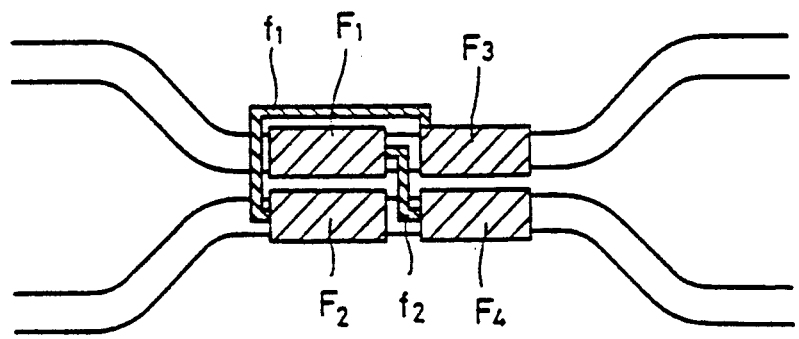
FIG. 4 is a plane pattern diagram showing an example of connection of electrodes mounted on a junction of the optical function element of FIG. 3 whose optical waveguides are formed of a semiconductor material.
Figure 5:
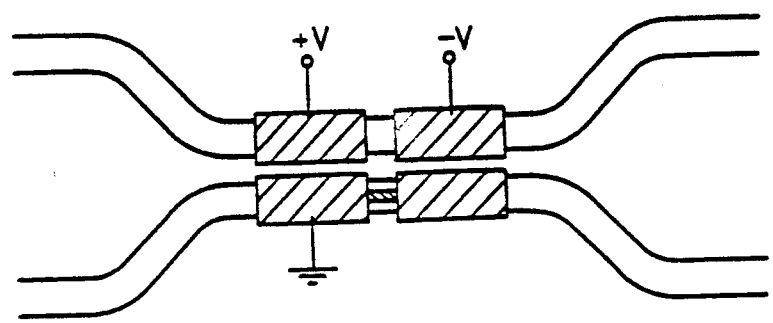
FIG. 5 is a plane pattern diagram showing an example of connection of electrodes mounted on a junction of the optical function element of FIG. 3 whose optical waveguides are formed of a dielectric material.
Figure 6:
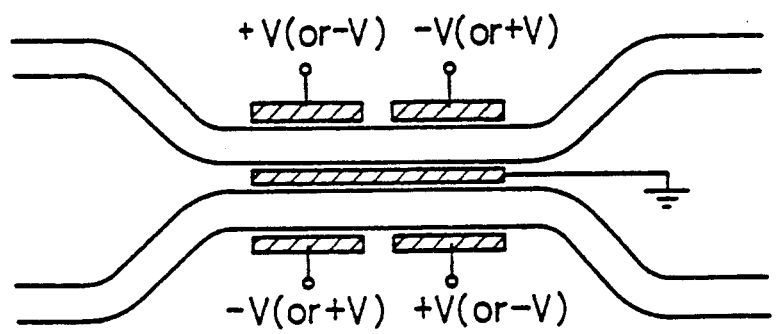
FIG. 6 is a plane pattern diagram showing another example of connection of electrodes mounted on the junction of the optical function element of FIG. 3 whose optical waveguides are formed of a dielectric material.

The states of connection between electrodes $F_1$, $F_2$, $F_3$ and $F_4$ at the partial junctions $C_4$ and $C_6$ vary depending on the optical waveguide material used. If the waveguide material is a semiconductor, for example, it is necessary only to provide an inverted $\Delta B$ structure such that the electrodes $F_2$ and $F_3$ and the electrodes $F_1$ and $F_4$ are connected by means of leads $f_1$ and $f_2$, respectively, as shown in FIG. 4. If the waveguide material is a dielectric, such as $LiNbO_3$, it is necessary only to make connections corresponding to the crystalline orientation of the dielectric, as shown in FIGS. 5 and 6.

In the optical function element of the present invention, the equivalent incidence-side lead section $(C_1 + C_3)$, formed of the incidence-side lead section $C_1$ and the front-stage partial junction $C_3$, and the equivalent emergence-side lead section $(C_2 + C_7)$, formed of the emergence-side lead section $C_2$ and the rear-stage partial junction $C_7$, serve that coupling effect of section $(C_2 + C_7)$ equal to the coupling effect of section $(C_1 + C_3)$. In the element as a whole, therefore, the front-stage partial junction $C_4$ with electrode, central partial junction $C_5$, and rear-stage partial junction $C_5$ with electrode develop a state equivalent to the one obtained in the case where the incidence- and emergence-side lead sections are perfectly symmetrical. Thus, the extinction ratio for a cross mode can be prevented from lowering.

The central partial junction $C_5$ formed in the junction $C_0$ is adjusted to a length such that the extinction ratio tends to infinity in the through mode, that is, a connection (or coupling effect) equivalent to the connection (or coupling effect) at the combination of the incidence- and emergence-side lead sections $C_1$ and $C_2$ and the partial junctions $C_3$ and $C_7$ can be obtained. In this case, the extinction ratio for the through mode is unlimited theoretically.

Thus, in the optical function element of the invention, the extinction ratio for either of the cross and through modes is much higher than in the conventional cases.

Figure 7:
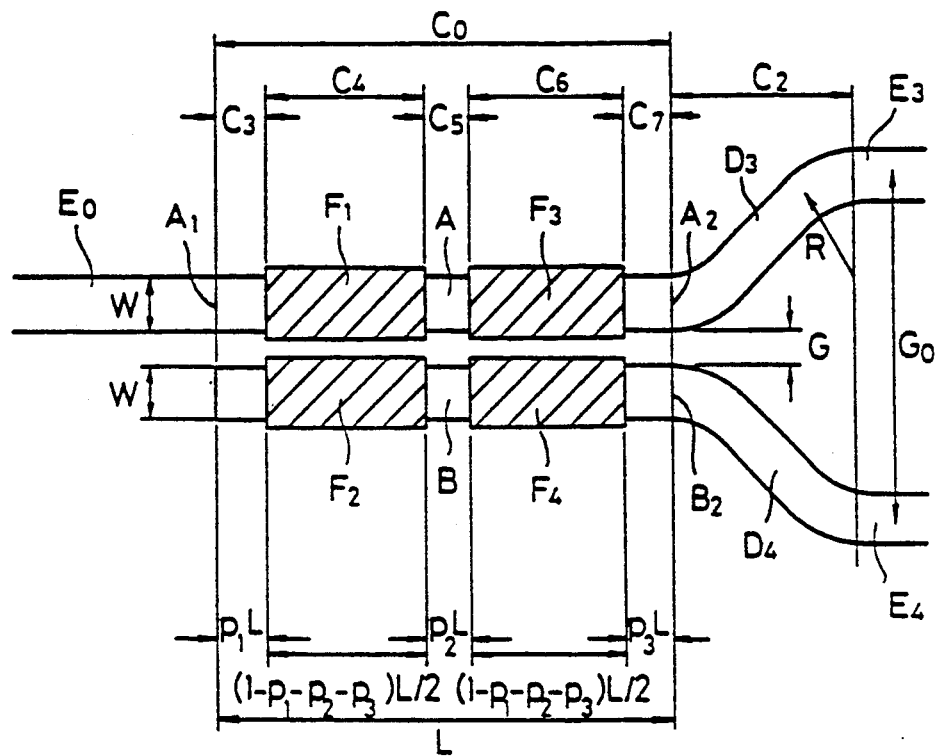
FIG. 7 is a plane pattern diagram showing the basic configuration of a 1-input/2-output directional coupler type optical function element according to the present invention.

FIG. 7 shows the basic configuration of a 1-input/2-output directional coupler type optical function element according to the present invention.

A plane pattern of this optical function element differs from the conventional 1-input/2-output directional coupler type optical function element shown in FIG. 2 only in that a junction $C_0$ is constructed as follows.

First, two optical waveguides A and B with the same width (path width W) are arranged parallel to each other with a fine space G between them at the junction $C_0$, and a straight optical waveguide $E_0$ with a path width W is optically connected to an incidence end $A_1$ of the one waveguide A, thus constituting an incidence port. Also, curved optical waveguides $D_3$ and $D_4$ with a curvature radius R and the path width W are optically connected to emergence ends $A_2$ and $B_2$ of the waveguides A and B, respectively, thus constituting an emergence-side lead section $C_2$. Moreover, straight optical waveguides $E_3$ and $E_4$ with the path width W are optically connected to the curved optical waveguides $D_3$ and $D_4$, respectively, so that the distance between the respective path-width centers of the waveguides $E_3$ and $E_4$ is $G_0$, thus constituting a through port ($E_3$) and a cross port ($E_4$), respectively.

In the case of this optical function element, as in the case of the element shown in FIG. 3, the emergence-side lead section $C_2$ is not limited to the illustrated arrangement including the curved optical waveguides. Alternatively, for example, the emergence ends $A_2$ and $B_2$ may be optically connected to the straight optical waveguides $E_3$ and $E_4$, respectively, by means of finely tapered straight optical waveguides.

Any of these optical waveguides, like those of the optical function element shown in FIG. 3, is formed of a material which generates an electrooptical effect or a material of a structure such that its refractive index can be controlled by means of an electrical signal.

As in the case of the optical function element shown in FIG. 3, the junction $C_0$ is formed by optically connecting a front-stage partial junction $C_3$, front-stage partial junction $C_4$ with electrode, central partial junction $C_5$, rear-stage partial junction $C_6$ with electrode, and rear-stage partial junction $C_7$ in the order named, ranging from the incidence end $A_1$ to the emergence ends $A_2$ and $B_2$ thereof.

If the overall length of the junction $C_0$ is L, and if $p_1$, $p_2$ and $p_3$ are decimals or zero satisfying a relation $p_1+p_2+p_3<1$ ($p_1$, $p_2\neq 0$), the length of the front-stage partial junction $C_3$ is $p_1 \times L$, that of the front-stage partial junction $C_4$ with electrode is $(1-p_1-p_2-p_3)\times L/2$, that of the central partial junction $C_5$ is $p_2\times L$, that of the rear-stage partial junction $C_6$ with electrode is $(1-p_1-p_2-p_3)\times L/2$, and that of the rear-stage partial junction $C_7$ is $p_3\times L$.

In this case, the coefficients $p_1$ and $p_3$ are selected as values such that the connection at the front-stage partial junction $C_3$ with the length $p_1\times L$ is coincident with the connection at the combination of the rear-stage partial junction $C_7$ and the emergence-side lead section $C_2$, so that the whole element is equivalent to the one obtained in the case where the incidence- and emergence-side lead sections are perfectly symmetrical.

The coefficient $p_2$ is selected as a value such that the central partial junction $C_6$ has a length corresponding to a maximum or infinite value of the extinction ratio as measured in a through mode with the length of the junction $C_5$ varied.

Figure 8:
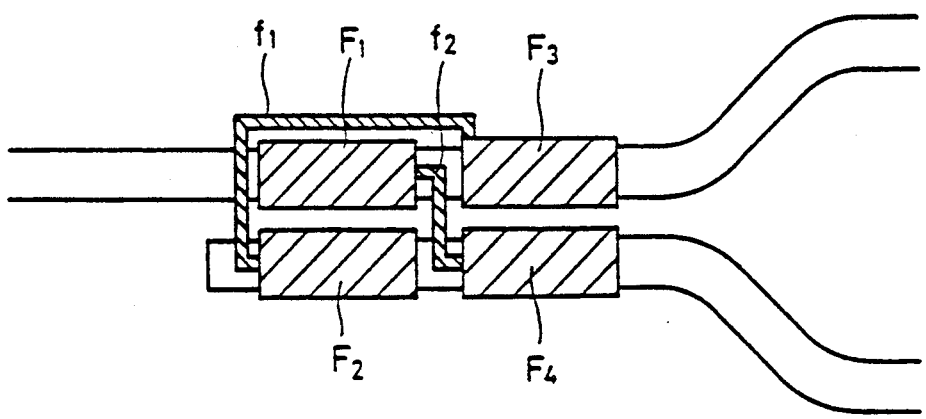
FIG. 8 is a plane pattern diagram showing an example of connection of electrodes mounted on a junction of the optical function element of FIG. 7 whose optical waveguides are formed of a semiconductor material.
Figure 9:
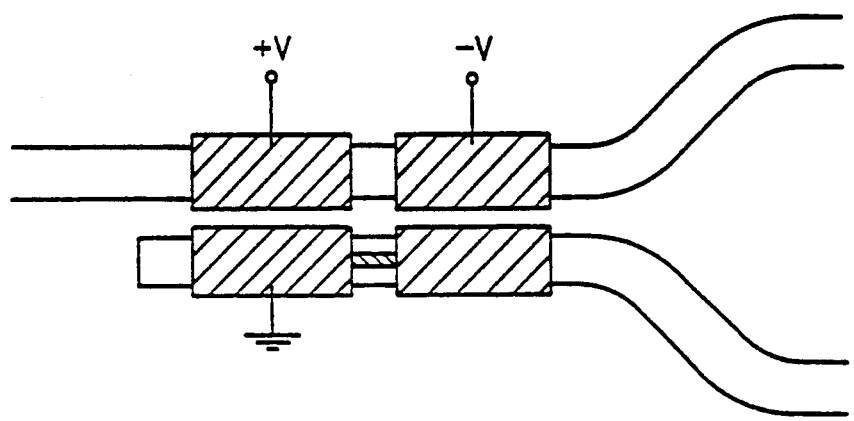
FIG. 9 is a plane pattern diagram showing an example of connection of electrodes mounted on a junction of the optical function element of FIG. 7 whose optical waveguides are formed of a dielectric material.
Figure 10:
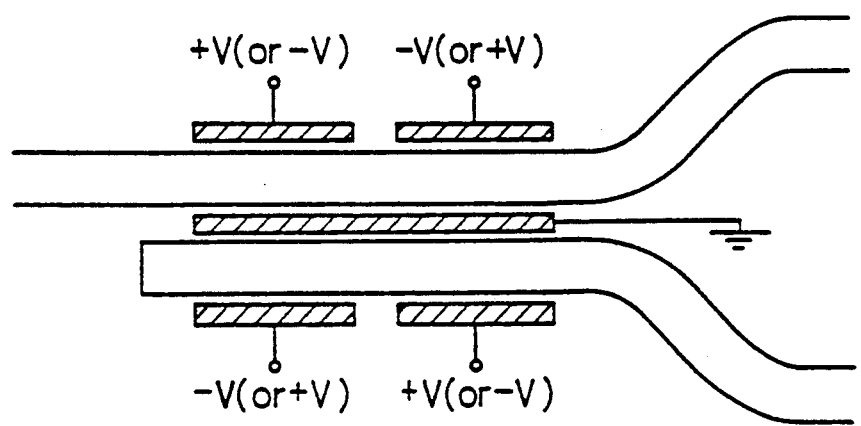
FIG. 10 is a plane pattern diagram showing another example of connection of electrodes mounted on the junction of the optical function element of FIG. 7 whose optical waveguides are formed of a dielectric material.

The states of connection between electrodes $F_1$, $F_2$, $F_3$ and $F_4$ at the partial junctions $C_4$ and $C_6$ vary depending on the optical waveguide material used. If the waveguide material is a semiconductor, for example, it is necessary only to provide an inverted $\Delta\beta$ structure such that the electrodes $F_2$ and $F_3$ and the electrodes $F_1$ and $F_4$ are connected by means of leads $f_1$ and $f_2$, respectively, as shown in FIG. 8. If the waveguide material is a dielectric, such as LiNbO$_3$, it is necessary only to make connections corresponding to the crystalline orientation of the dielectric, as shown in FIGS. 9 and 10.

Also in the case of this 1-input/2-output directional coupler type optical function element, the connection at the front-stage partial junction $C_3$ is coincident with the connection at the combination of the rear-stage partial junction $C_7$ and the emergence-side lead section $C_2$. In this directional coupler as a whole, therefore, the front-stage partial junction $C_4$ with electrode, central partial junction $C_5$, and rear-stage partial junction $C_6$ with electrode generate a state equivalent to the one obtained in the case where the incidence- and emergence-side lead sections are perfectly symmetrical. Thus, the extinction ratio can be prevented from lowering in a cross mode.

The central partial junction $C_5$ is adjusted to a length such that the extinction ratio for the through mode has its maximum.

Figure 2:
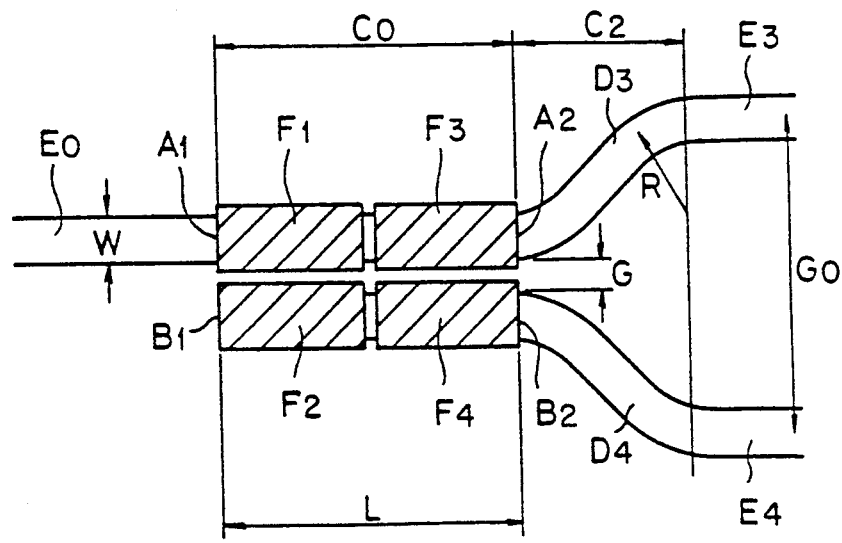
FIG. 2 is a plane pattern diagram showing a configuration of a conventional 1-input/2-output directional coupler.

Thus, also in the case of this optical function element, the extinction ratio for either of the cross and through modes is much higher than in the conventional case shown in FIG. 2.

Embodiment 1

Figure 11:
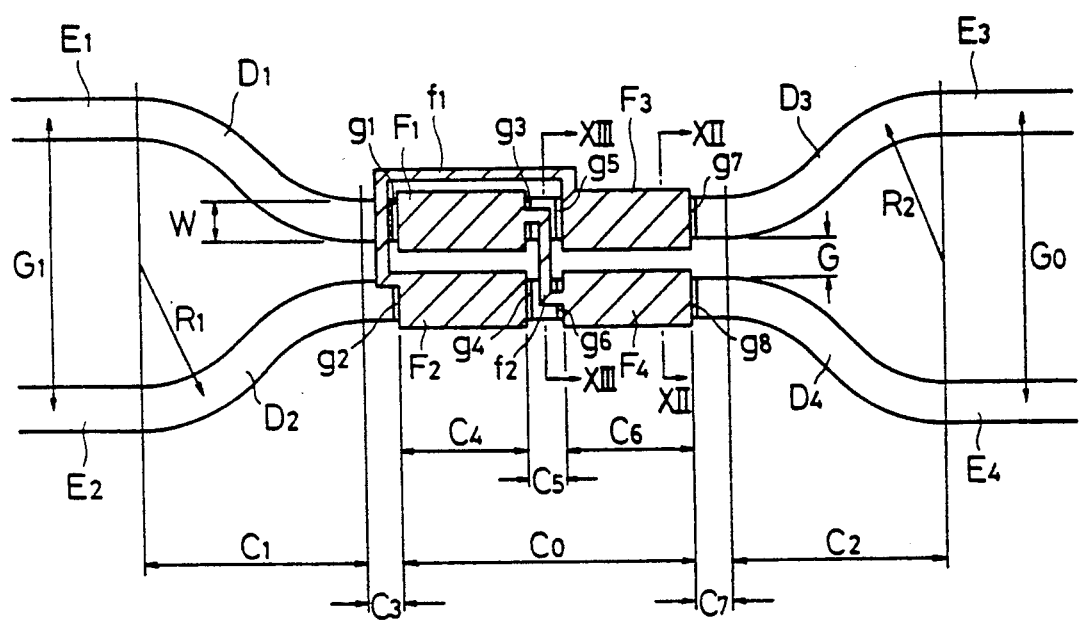
FIG. 11 is a plane pattern diagram showing a 2-input/2-output directional coupler type optical function element according to Embodiment 1 or 2.

A 2-input/2-output directional coupler type optical function element of the present invention shown in the plane pattern diagram of FIG. 11 was manufactured. This optical function element is a modified version of the element shown in FIG. 3, in which $p_1=p_3\neq 0$ is given.

In FIG. 11, the length of the junction $C_0$ is 5.0 mm, the distance G between the optical waveguides A and B is 2.5 μm, the distance $G_0$ and $G_1$ between the through port $E_3$ and the cross port $E_4$ and between the incidence ports $E_1$ and $E_2$ are both 250 μm, the curvature radius $R_1$ of the curved optical waveguides $D_1$ and $D_2$ and the curvature radius $R_2$ of the curved optical waveguides $D_3$ and $D_4$ are both 30 mm, and the path width W is 7 μm.

Gaps $g_1$ and $g_2$, $g_3$ and $g_4$, $g_5$ and $g_6$, and $g_7$ and $g_8$ with a length of several micrometers are formed between the incidence-side lead section $C_1$ and the front-stage partial junction $C_4$ with electrode, between the partial junction $C_4$ and the central partial junction $C_5$, between the partial junction $C_6$ and the rear-stage partial junction $C_6$ with electrode, and between the partial junction $C_6$ and the emergence-side side lead section $C_2$, respectively. These gaps are provided lest an electrical signal introduced into each electrode influence other electrodes.

The length $p_1\times L$ of the front-stage partial junction $C_3$ is 113 μm ($p_1=0.0226$), the length $p_3\times L$ of the rear-stage partial junction $C_7$ is 113 μm ($p_3=0.0226$), the length $p_2\times L$ of the central partial junction $C_5$ is 548 μm ($p_2=0.1096$), and those of the front-stage partial junction $C_4$ with electrode and the rear-stage partial junction $C_6$ with electrode are both 2.113 mm.

Figure 12:
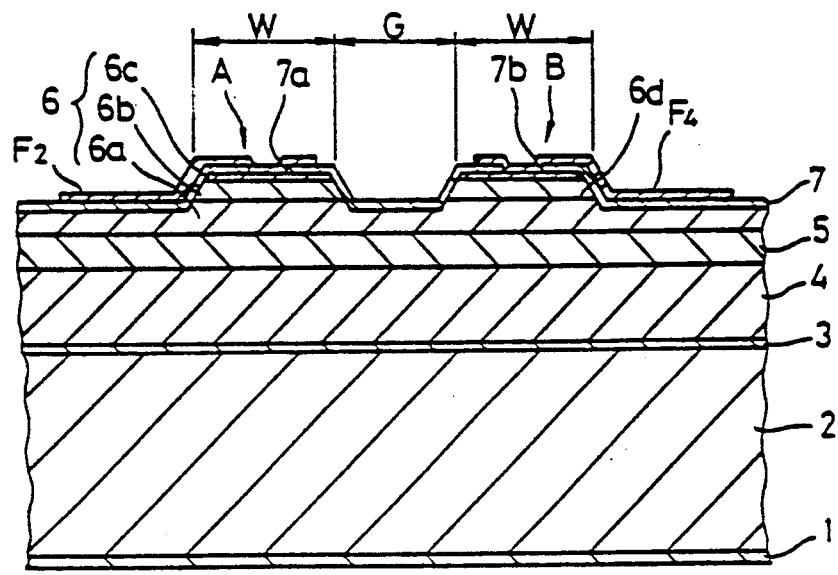
FIG. 12 is a sectional view taken along line XII—XII of FIG. 11.
Figure 13:
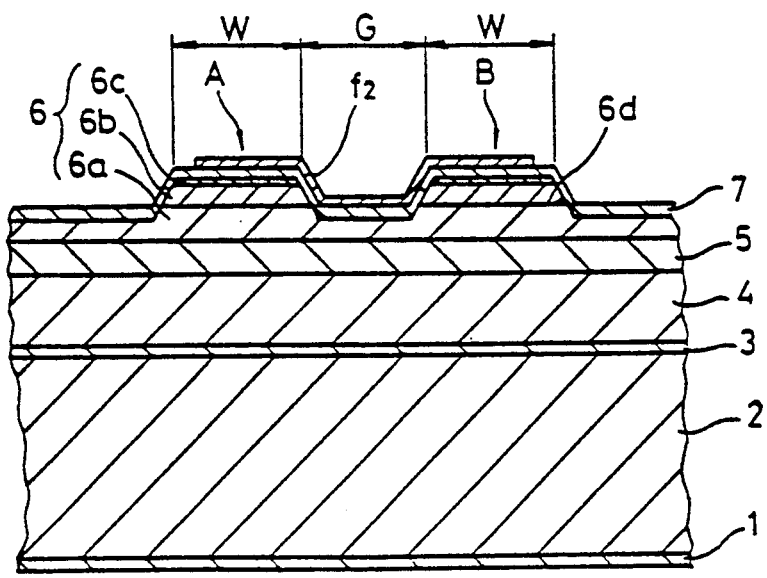
FIG. 13 is a sectional view taken along line XIII—XIII of FIG. 11.

The front- and rear-stage partial junctions $C_4$ and $C_6$ with electrode and the central partial junction $C_5$ of the junction $C_0$ are arranged as shown in FIGS. 12 and 13, which are sectional views taken along lines XII—XII and XIII—XIII, respectively, of FIG. 11.

More specifically, a substrate 2 of n−GaAs, a buffer layer of n−GaAlAs with a thickness of 0.5 μm, a lower cladding layer 4 of n−GaAs with a thickness of 1.0 μm are stacked in layers on a lower electrode 1 of AuGeNi/Au, in the order named, by the MOCVD method. Further, a cladding 6a of n−GaAlAs, a cladding 6b of p−GaAlAs, and a cap 6c of p+GaAs are successively stacked in layers on the core layer 5 by the MOCVD method, thus constituting an upper cladding layer 6. The top of the cladding layer 6 is coated with an insulating film 7, such as an SiO$_2$ film. Thus, the two optical waveguides A and B with the path width W are formed ridge-shaped with the distance G between them.

At the regions where the electrodes $F_1$, $F_2$, $F_3$ and $F_4$ are to be mounted, as shown in FIG. 12, part of the insulating film 7 is removed to form a slit-shaped window 7a. Ti/Pt/Au is, for example, deposited on the top face of the cap 6c through the window 7a, thus forming the electrodes $F_3$ and $F_4$.

In FIG. 13, the lead $f_2$ for connecting the electrodes $F_1$ and $F_4$ is formed on the insulating film 7.

In the optical waveguides A and B formed in this manner, the interface between the cladding $6a$ and $6b$ constitutes a pn-junction interface $6d$. If specific electrical signals are introduced from the electrodes $F_1$, $F_2$, $F_3$ and $F_4$, therefore, an electrooptical effect, plasma effect, band filling effect, etc. develop at the pn-junction interface $6d$, so that the refractive index of those portions of the core layer which are situated right under the electrodes changes, and hence, the state of optical connection between the optical waveguides A and B changes.

Figure 14:
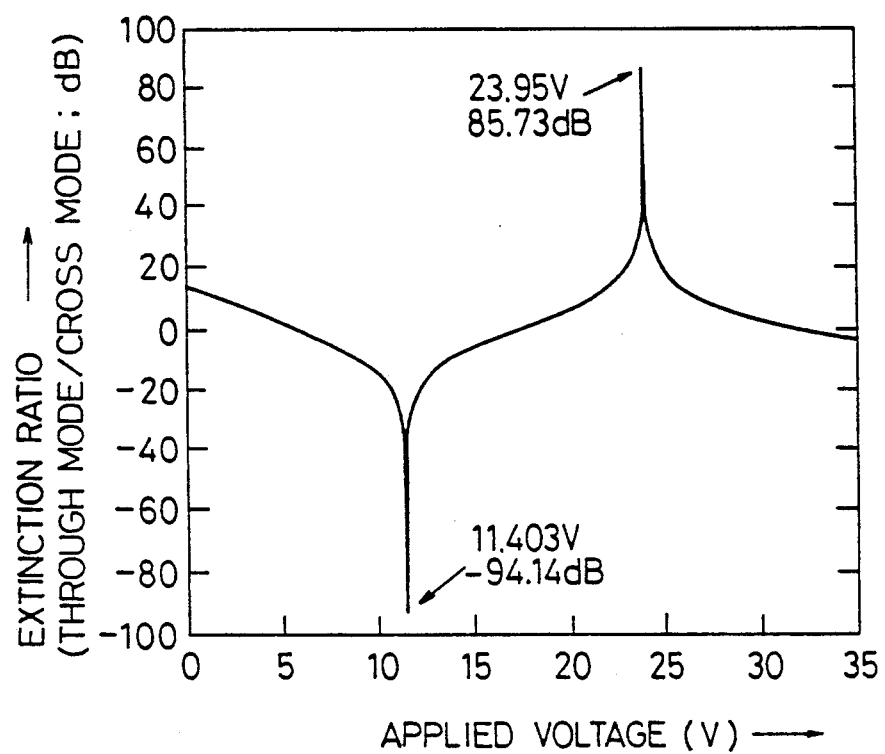
FIG. 14 shows a theoretical characteristic curve representing the switching characteristic of the optical function element of Embodiment 1.

FIG. 14 shows a theoretical characteristic curve representing the switching characteristic of this element obtained when a TE mode light beam with a wavelength of 1.3 μm is excited at the incidence port $E_1$, and when only the electrooptical effect is developed by applying reverse bias voltage to the electrodes.

If the element is actually driven by means of the reverse bias voltage, the extinction ratio can be estimated at 30 dB or more.

Embodiment 2

Another 2-input/2-output directional coupler type optical function element was manufactured. This optical function element is a modified version of the element shown in FIG. 11, in which the length of the junction $C_0$ is 8 mm. W is 7 μm. $G_0$ ($=G_1$) is 250 μm. G is 3.5 μm. $R_1$ is 50 mm. $R_2$ is 30 mm. $p_1=0$, the length of the central partial junction $C_5$ is 656 μm ($p_2=0.082$), and the length of the rear-stage partial junction $C_7$ is 59 μm ($p_3=0.007375$). Gaps were formed between the individual partial junctions, as in the case of Embodiment 1.

Figure 15:
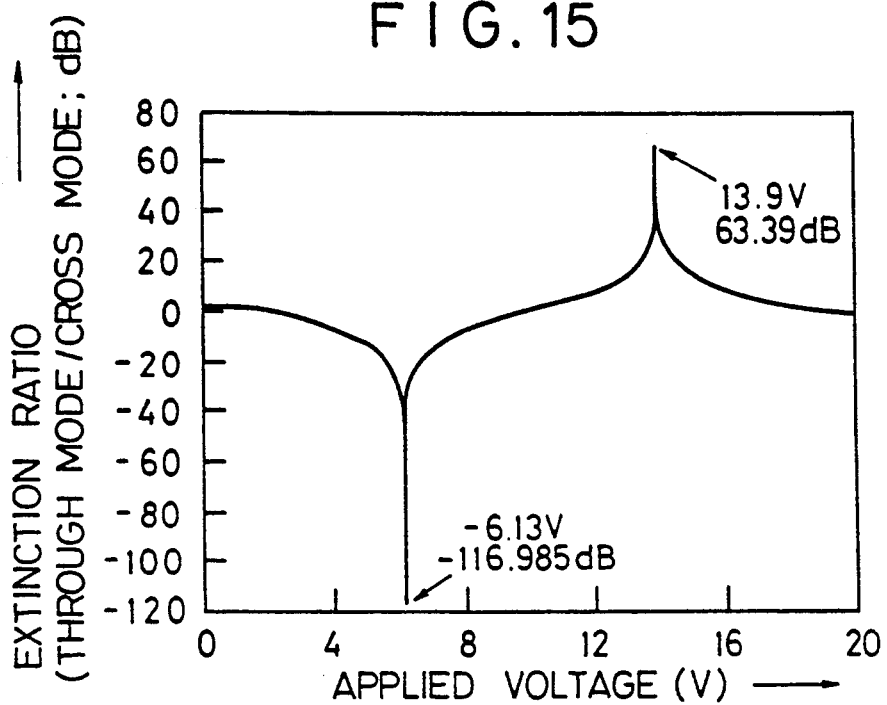
FIG. 15 shows a theoretical characteristic curve representing the switching characteristic of the optical function element of Embodiment 2.

FIG. 15 shows a theoretical characteristic curve representing the switching characteristic of this element obtained when a TE mode light beam with a wavelength of 1.3 μm is excited at the incidence port $E_1$, and when only the electrooptical effect is developed by applying reverse bias voltage to the electrodes.

When the element is actually driven by means of the reverse bias voltage, the extinction ratio can be estimated at 30 dB or more if the applied voltage in the cross mode is $-7$ V or if the applied voltage in the through mode is $-15$ V, in view of the conditions of a measurement system.

Figure 16:
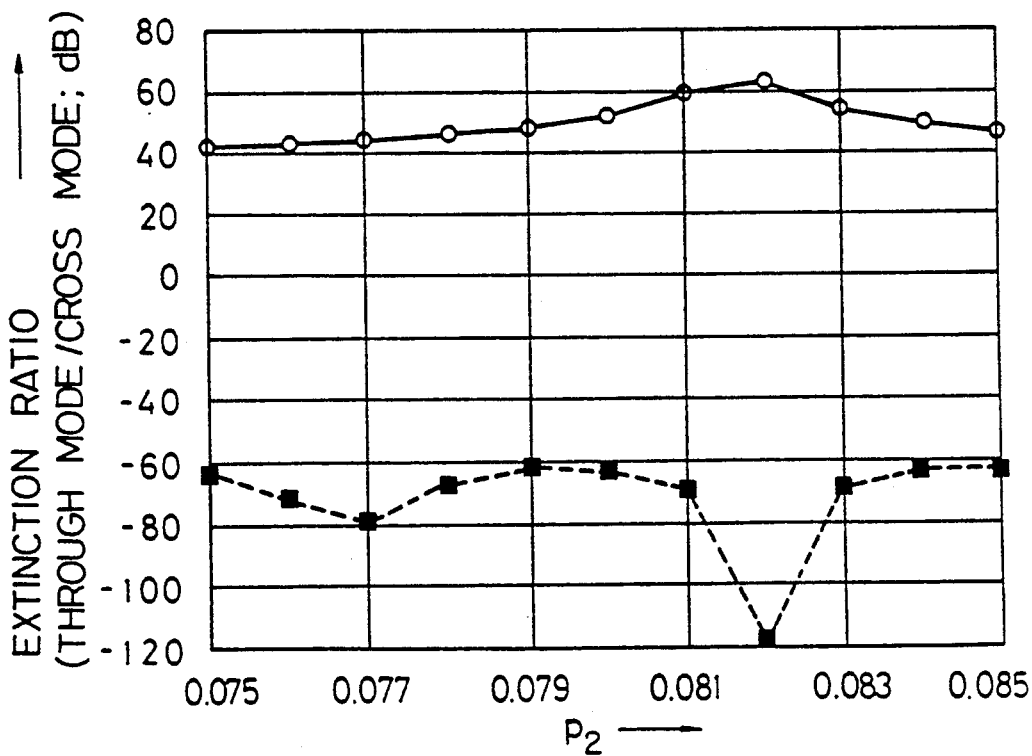
FIG. 16 is a graph showing the relationship between the extinction ratio and value $p_2$ of the optical function element of Embodiment 2.

FIG. 16 shows the relationship between the fluctuation of the extinction ratio and the coefficient $p_2$ of the element observed when the coefficient $p_2$ is varied to change the length $p= \times L$ of the central partial junction $C_5$. In FIG. 16, circles and black squares represent the through mode and the cross mode, respectively. As seen from FIG. 16, this element exhibits the extinction ratio of 60 dB or more.

In the case of this element, moreover, the extinction ratio for the cross mode is not lowered despite the different curvature radii of the incidence- and emergence-side lead sections $C_1$ and $C_2$.

Embodiment 3

Figure 17:
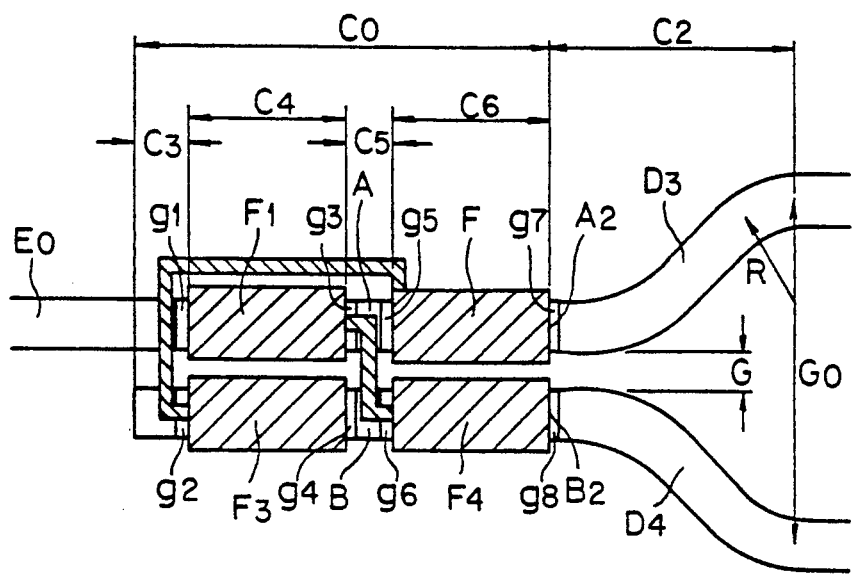
FIG. 17 is a plane pattern diagram showing a 1-input/2-output directional coupler type optical function element according to Embodiment 3.

A 1-input/2-output directional coupler type optical function element was manufactured, as shown in the plane pattern diagram of FIG. 17. This optical function element is a modified version of the element shown in FIG. 7, in which $p_3=0$ is given, that is, the the emergence ends $A_2$ and $B_2$ of the optical waveguides A and B are optically connected to the curved optical waveguides $D_3$ and $D_4$, respectively, in a direct manner, without using the rear-stage partial junction.

In FIG. 17, the length of the junction $C_0$ is 7.5 mm, the distance G between the optical waveguides A and B is 3.5 μm, the distance $G_0$ between the respective path-width centers of the through port $E_3$ and the cross port $E_4$ is 250 μm, the curvature radius R of the curved optical waveguides $D_3$ and $D_4$, which constitute the emergence-side lead section $C_2$, is 30 mm, and the path width W is 7 μm. In this element, as in the case of the element of Embodiment 1, gaps $g_1$ and $g_2$, $g_3$ and $g_4$, $g_5$ and $g_6$, and $g_7$ and $g_8$ are formed between the individual partial junctions lest an electrical signal introduced into each electrode adversely affect other electrodes.

The length $p_1 \times L$ of the front-stage partial junction $C_3$ is 267 μm ($p_1=0.0356$), the length $p_2 \times L$ of the central partial junction $C_5$ is 540 μm ($p_2=0.072$), and those of the front-stage partial junction $C_4$ with electrode and the rear-stage partial junction $C_6$ with electrode are both 3.3465 mm.

The front- and rear-stage partial junctions $C_4$ and $C_6$ with electrode and the central partial junction $C_5$ of the junction $C_0$ have the same sectional configurations as the ones described in connection with the optical function element of Embodiment 1.

Figure 18:
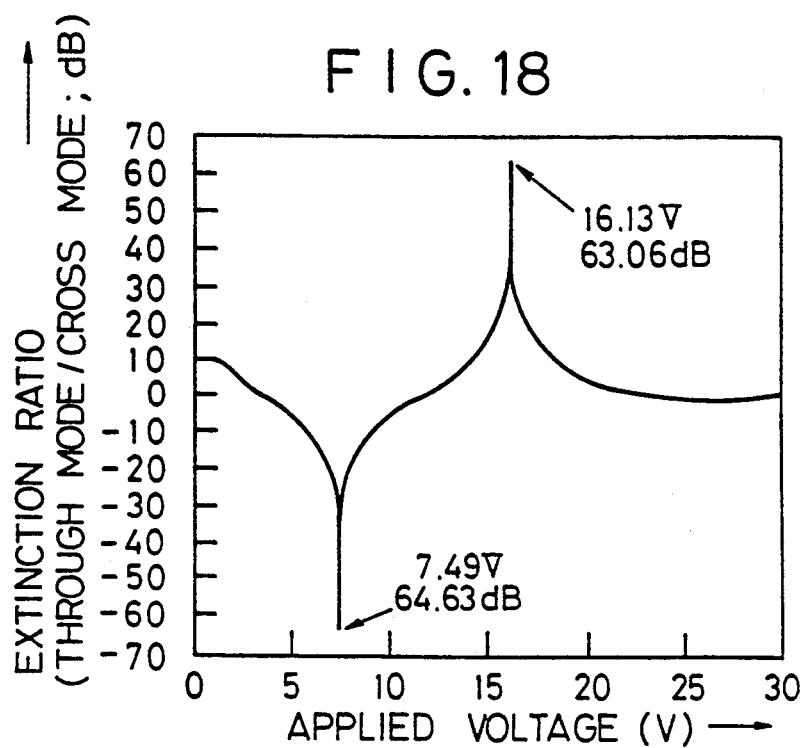
FIG. 18 shows a theoretical characteristic curve representing the switching characteristic of the optical function element of Embodiment 3.

FIG. 18 shows a theoretical characteristic curve representing the switching characteristic of this element obtained when a TE mode light beam with a wavelength of 1.3 μm is excited at the incidence port $E_0$, and when only the electrooptical effect is developed by applying reverse bias voltage to the electrodes.

When the element is actually driven by means of the reverse bias voltage, the extinction ratio can be estimated at 30 dB or more if the applied voltage in the cross mode is $-8.5$ V or if the applied voltage in the through mode is $-19$ V, in view of the conditions of a measurement system.

Figure 19:
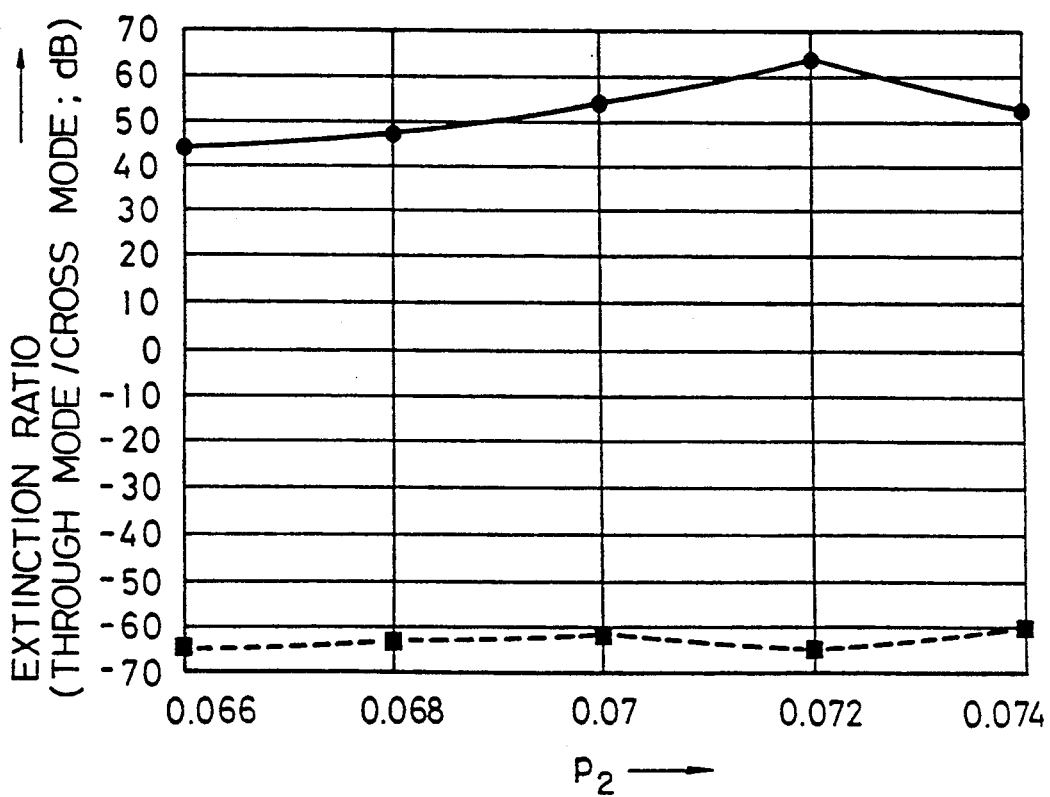
FIG. 19 is a graph showing the relationship between the extinction ratio and value $p_2$ of the optical function element of Embodiment 3.

FIG. 19 shows the relationship between the fluctuation of the extinction ratio and the coefficient $p_2$ of the element observed when the coefficient $p_2$ is varied to change the length $p_2 \times L$ of the central partial junction $C_5$. In FIG. 19, black spots and black squares represent the through mode and the cross mode, respectively.

As seen from FIG. 19, this element can enjoy the extinction ratio of 40 dB or more without regard to the mode, through or cross, even if $p_2$ or the length of the central partial junction $C_5$ somewhat varies.

It is evident from FIG. 19 along with FIG. 20 mentioned below, moreover, that the coefficients $p_1$, $p_2$ and $p_3$ should be selected at certain values for the maximum extinction ratio of the element.

Figure 20:
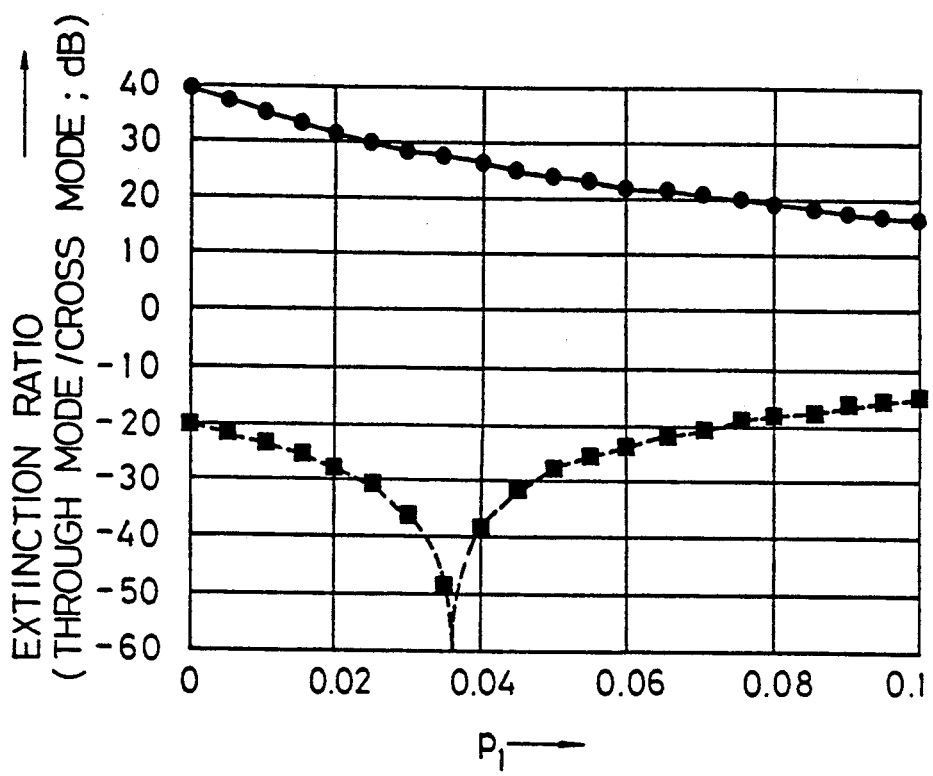
FIG. 20 is a graph showing the theoretical relationship between the extinction ratio and value $p_2$ of the optical function element of Embodiment 3 observed where $p_2 = p_3 = 0$ is given.

FIG. 20 shows theoretical characteristic curves representing the transitions of the extinction ratio at the through port $E_3$ and the cross port $E_4$ with $p_2=p_3=0$ and $p_1$ varied. In FIG. 20, black spots and black squares represent the extinction ratios of the through port and the cross port, respectively. As seen from these curves, the extinction ratio of the cross port is 40 dB or more when $p_1$ ranges from 0.032 to 0.039, and the cross port exhibits its maximum extinction ratio when the front-stage partial junction $C_3$ is formed having $p_1$ in the vicinity of 0.035616.

In the case of the element having $G_0$, R, G and W set at the aforementioned values, therefore, the extinction ratio for the cross mode inevitably lowers unless $p_1$ and $p_3$ are set at 0.035616 and 0, respectively.

If $p_2$ is deviated from 0.072, moreover, the maximum extinction ratio for the through mode cannot take the value, 63.06 dB, shown in FIG. 18. As seen from FIG.

19, however, this element exhibits the extinction ratio of at least 40 dB.

Embodiment 4

Another 1-input/2-output directional coupler type optical function element was manufactured. This optical function element is a modified version of the element shown in FIG. 7, in which the length of the junction $C_0$ is 6 mm, W is 6 μm, $G_0$ is 250 μm, G is 3.0 μm, R is 50 mm, the length of the front-stage partial junction $C_3$ is 249 μm ($p_1$=0.0415), the length of the central partial junction $C_5$ is 498 μm ($p_2$=0.083), and $p_3$ is 0. Gaps were formed between the individual partial junctions, as in the case of Embodiment 3.

Figure 21:
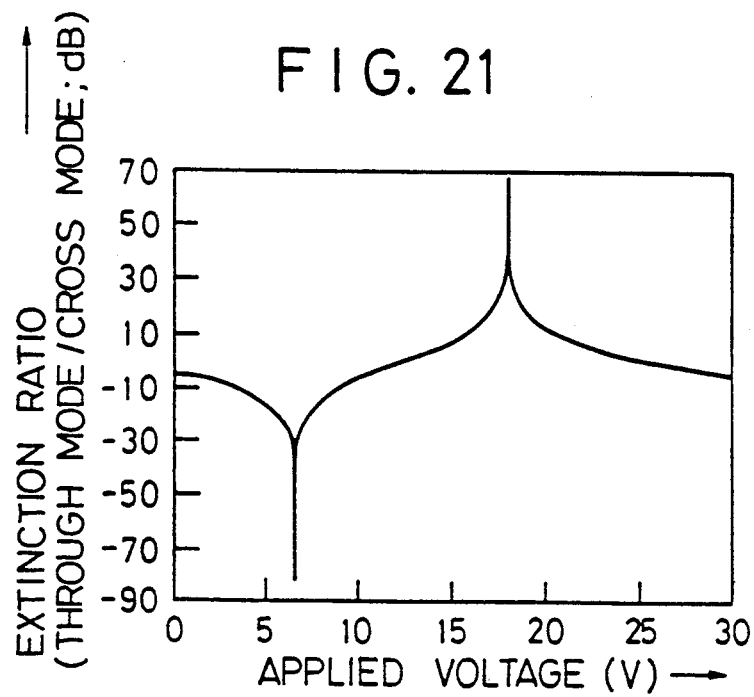
FIG. 21 shows a theoretical characteristic curve representing the switching characteristic of the optical function element of Embodiment 4.

FIG. 21 shows a theoretical characteristic curve representing the switching characteristic of this element obtained when a TE mode light beam with a wavelength of 1.3 μm is excited at the incidence port $E_0$, and when only the electrooptical effect is developed by applying reverse bias voltage to the electrodes.

When the element is actually driven by means of the reverse bias voltage, the extinction ratio can be estimated at 30 dB or more if the applied voltage in the cross mode is −8.0 V or if the applied voltage in the through mode is −20.0 V, in view of the conditions of a measurement system.

Figure 22:
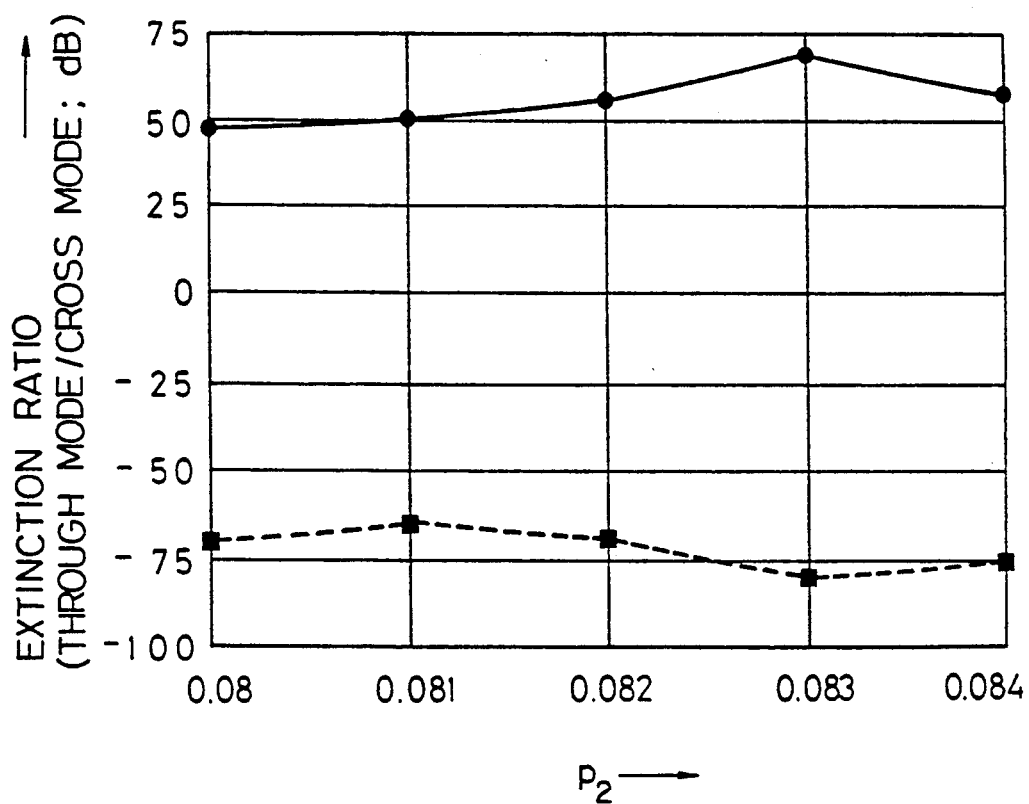
FIG. 22 is a graph showing the relationship between the extinction ratio and value $p_2$ of the optical function element of Embodiment 4.

FIG. 22 shows the relationship between the fluctuation of the extinction ratio and the coefficient $p_2$ of the element observed when the coefficient $p_2$ is varied to change the length $p_2 \times L$ of the central partial junction $C_5$. In FIG. 22, black spots and black squares represent the through mode and the cross mode, respectively.

The element of this embodiment can also enjoy the extinction ratio of 30 dB or more for either of the through and cross modes.

Thus, in the directional coupler type optical function element according to the present invention, the front- and rear-stage partial junctions serve to remove the asymmetry of connection between the incidence- and emergence-side lead sections of the conventional directional couplers, and prevent the extinction ratio for the cross mode from lowering. Since the central partial junction is formed having a length such that the extinction ratio for the through mode has its maximum, moreover, the through-mode extinction ratio can be also kept high. In other words, the optical function element of the invention exhibits a high extinction ratio for either of the through and cross modes.

Thus, by incorporating the element of the present invention in an optical communication system, the possibility of cross talk can be lowered, and optical signals can be transmitted with improved accuracy.

In the embodiments described above, the optical function element of the present invention is driven as an optical switch. Alternatively, however, it may be used as a polarizing splitter which simultaneously performs, for example, injection of forward current from the electrodes and application of reverse voltage, thereby separating a TE mode light beam from a TM mode light beam. Further, the element can be used as an optical modulator or wavelength division multiplexer/demultiplexer with high extinction ratio characteristics.

We claim:

1. A directional coupler type optical function element comprising:

a directional coupler including a junction of a length L having two parallel optical waveguides of equal widths formed of a material exhibiting an electro-optical effect or a material capable of refractive index control by means of an electrical signal;

at least one optical waveguide optically connected to an incidence end of one of the optical waveguides of the junction; and curved optical waveguides connected individually to respective emergence ends of the two optical waveguides of the junction, said junction including a front-stage partial junction of a length $p_1 \times L$, a front-stage partial junction with an electrode of a length $(1-p_1-p_2-p_3) \times L/2$, a central partial junction of a length $p_2 \times L$, a rear-stage partial junction with an electrode of the same length as that of the front-stage partial junction with an electrode, and a rear-stage partial junction of a length $p_3 \times L$, said $p_1$, $p_2$ and $p_3$ being decimals or zero satisfying a relation $p_1+p_2+p_3<1$ ($p_2 \neq 0$, and $p_1$ and $P_3$ are not simultaneously zero).

2. A directional coupler type optical function element according to claim 1, wherein said curved optical waveguides are optically connected to the respective incidence ends of the two optical waveguides of said junction, thereby forming an incidence-side lead section, the curved optical waveguides being optically connected to the respective emergence ends of the two optical waveguides of said junction, thereby forming an emergence-side lead section, and said $p_1$, $p_2$ and $p_3$ are decimals or zero satisfying a relation $p_1+p_2+p_3<1$ ($p_1=p_3 \neq 0$).

3. A directional coupler type optical function element according to claim 1, wherein only one of the two optical waveguides of said junction is optically connected at the incidence end thereof with a straight optical waveguide, the curved optical waveguides are optically connected to the respective emergence ends of the two optical waveguides of said junction, thereby forming an emergence-side lead section, and said $p_1$, $p_2$ and $p_3$ are decimals or zero satisfying a relation $p_1+p_2+p_3<1$ ($p_1$, $p_2 \neq 0$).

4. A directional coupler type optical function element according to claim 3, wherein said junction is arranged such that $p_3=0$ and $p_1$, $p_2 \neq 0$.

* * * * *